(12) United States Patent
Kang

(10) Patent No.: US 12,704,983 B2
(45) Date of Patent: Aug. 11, 2026

(54) COMPUTATIONAL STORAGE SYSTEM SUPPORTING MULTIPLE TOPOLOGIES AND METHOD OF OPERATION

(71) Applicant: SK hynix Inc., Icheon-si (KR)

(72) Inventor: Won Kyung Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/954,469

(22) Filed: Nov. 20, 2024

(65) Prior Publication Data

US 2026/0003524 A1 Jan. 1, 2026

(30) Foreign Application Priority Data

Jul. 1, 2024 (KR) ........................ 10-2024-0086274

(51) Int. Cl.
*G06F 3/06* (2006.01)

(52) U.S. Cl.
CPC .......... *G06F 3/0629* (2013.01); *G06F 3/0607* (2013.01); *G06F 3/0658* (2013.01); *G06F 3/0673* (2013.01)

(58) Field of Classification Search
CPC ...... G06F 3/0607; G06F 3/0644; G06F 3/067; G06F 13/385; G06F 13/4027; G06F 2213/3802; G06F 2213/3808
See application file for complete search history.

(56) References Cited

U.S. PATENT DOCUMENTS

| | | | | |
|---|---|---|---|---|
| 6,944,712 | B2 * | 9/2005 | Weber | G06F 3/067 711/114 |
| 2008/0104284 | A1 * | 5/2008 | Chuang | G06F 13/385 710/12 |
| 2012/0297125 | A1 | 11/2012 | Nasiby et al. | |
| 2016/0062690 | A1 * | 3/2016 | Shin | G06F 1/3287 711/103 |
| 2018/0246833 | A1 | 8/2018 | Bai et al. | |
| 2021/0072897 | A1 * | 3/2021 | Ishihara | G06F 3/0658 |
| 2022/0382944 | A1 * | 12/2022 | Yin | G06F 13/126 |
| 2024/0028507 | A1 * | 1/2024 | Kim | G06F 3/0679 |
| 2024/0202154 | A1 * | 6/2024 | Muntz | G06F 13/4022 |
| 2025/0130935 | A1 * | 4/2025 | Kuo | G06F 3/0625 |

* cited by examiner

*Primary Examiner* — Yong J Choe

(57) ABSTRACT

A computational storage system may include a computing circuit configured to execute an operation requested by a host, a storage device for storing data, and a switch configured to establish a connection among the host, the computing circuit and the storage device based on a topology for the host, the computing circuit and the storage device. The switch may establish the connections so that the host can directly access the computing circuit and the storage device when the topology is a first topology, and may establish the connections so that the host can directly access the computing circuit but the host cannot directly access the storage device when the topology is a second topology.

11 Claims, 10 Drawing Sheets topology = TP_1

COMPUTATIONAL STORAGE SYSTEM SUPPORTING MULTIPLE TOPOLOGIES AND METHOD OF OPERATION

CROSS-REFERENCE TO RELATED APPLICATION

The present application claims priority under 35 U.S.C. § 119 (a) to Korean patent application number 10-2024-0086274 filed in the Korean Intellectual Property Office on Jul. 1, 2024, which is incorporated herein by reference in its entirety.

TECHNICAL FIELD

Embodiments of the present disclosure relate to a computational storage system supporting multiple topologies and a method of operating the computational storage system.

BACKGROUND

A storage device is a device for storing data according to a request from an external device such as a computer, a mobile terminal (e.g., a smart phone or tablet), or the like.

A storage device may include a memory for storing data and a controller for controlling the memory. The memory may be a volatile memory or a non-volatile memory. The controller may receive a command from an external device (i.e., a host), and execute or control operations to read, write, or erase data in the memory of the storage device according to the received command.

A computational storage system may additionally include a computing circuit together with the aforementioned storage device. The computing circuit may execute a specific operation requested by an external device.

The computational storage system may set a topology between the storage device, the computing circuit, and the external device in order to efficiently perform an operation of storing data using the storage device and execute an operation using the computing circuit. The topology may indicate a connection relationship among the devices. The topology may be configured in various ways and the various configuration methods may have advantages and disadvantages.

SUMMARY

Embodiments of the disclosure may provide a computational storage system and an operating method capable of configuring an optimized topology according to an application executed by a host, without limiting the topology to a specific method.

In an aspect, embodiments of the disclosure may provide a computational storage system including a computing circuit configured to execute an operation requested by a host, a storage device for storing data, and a switch configured to establish a connection among the host, the computing circuit and the storage device based on a topology for the host, the computing circuit and the storage device.

The switch may, when the topology is a first topology, establish connections so that the host can directly access the computing circuit and the storage device. The switch may, when the topology is a second topology, establish connections so that the host can directly access the computing circuit and the host cannot directly access the storage device when the topology is a second topology.

In another aspect, embodiments of the disclosure may provide an operating method of a computational storage system including a step of determining a topology for a host, a computing circuit for executing an operation requested by the host, and a storage device for storing data, and a step of establishing a connection among the host, the computing circuit, and the storage device based on the topology.

The step of establishing a connection may include establishing the connection so that the host can directly access the computing circuit and the storage device when the topology is a first topology. The step of establishing a connection may include establishing the connection so that the host can directly access the computing circuit and the host cannot directly access the storage device when the topology is a second topology.

In another aspect, embodiments of the disclosure may provide a computational storage system including a computing circuit configured to execute an operation, a storage device for storing data, and a switch connected to the computing circuit and the storage device. In this case, the computational storage system may transmit an access request for the computing circuit or the storage device to the computing circuit or the storage device based on a set topology. The switch may distribute the access request to the computing circuit or the storage device when the set topology is a first topology, and the computing circuit may directly process the access request after receiving the access request or bypass the access request for the storage device when the set topology is a second topology.

According to embodiments of the present disclosure, it is possible to configure an optimized topology according to an application executed by a host without limiting the topology to a specific method.

DETAILED DESCRIPTION

Figure 1:
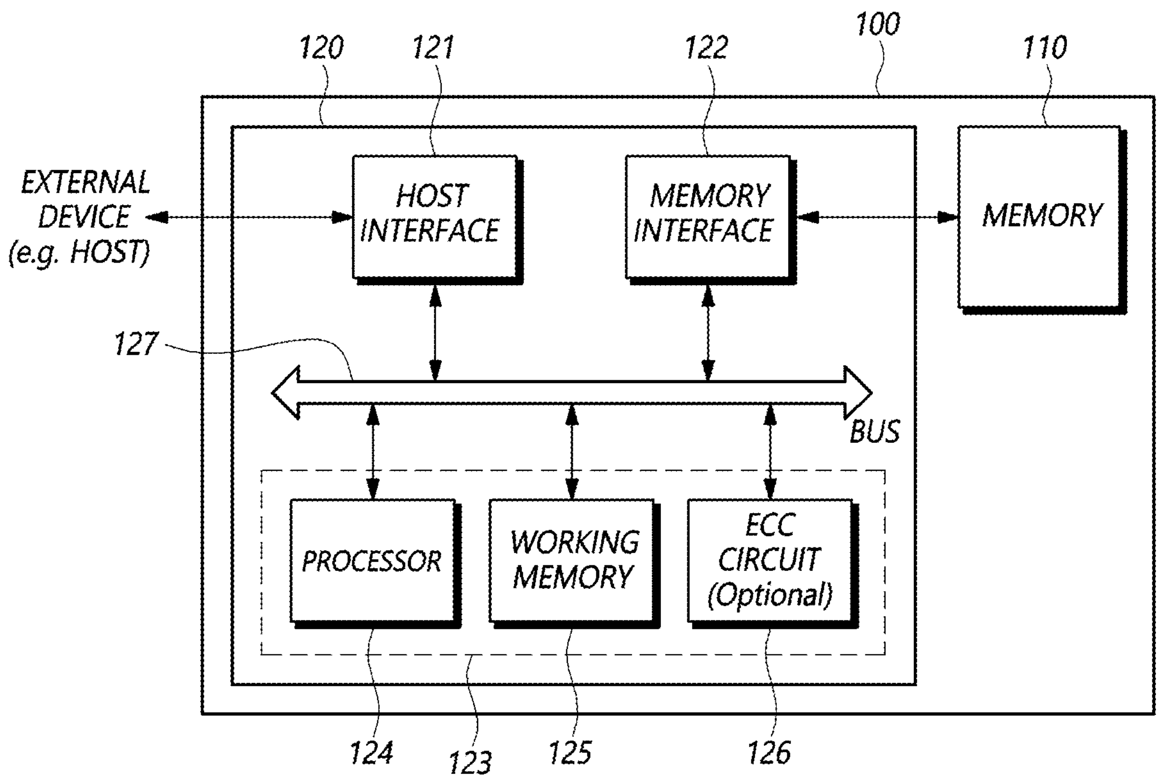
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinafter, the memory 110 will be described in further detail with reference to FIG. 2.

Figure 2:
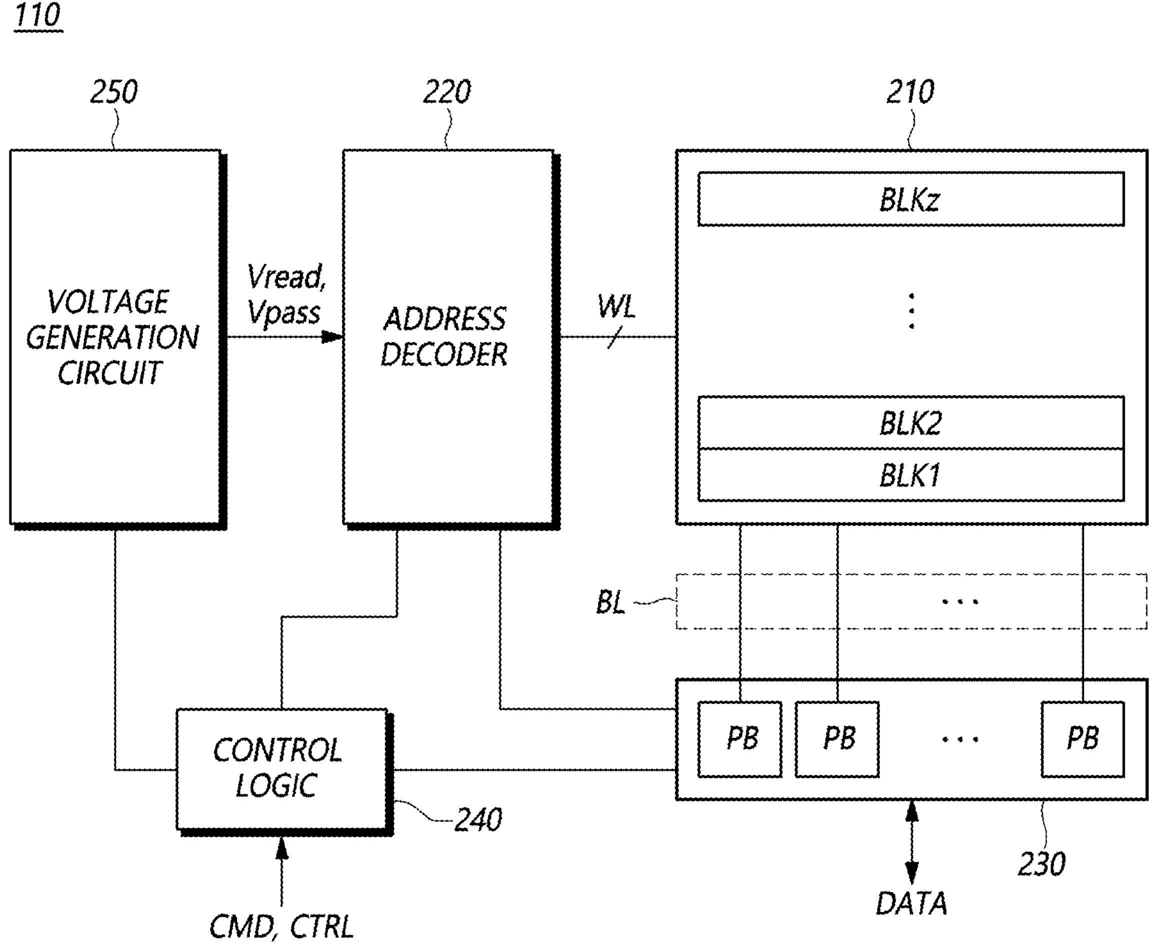
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
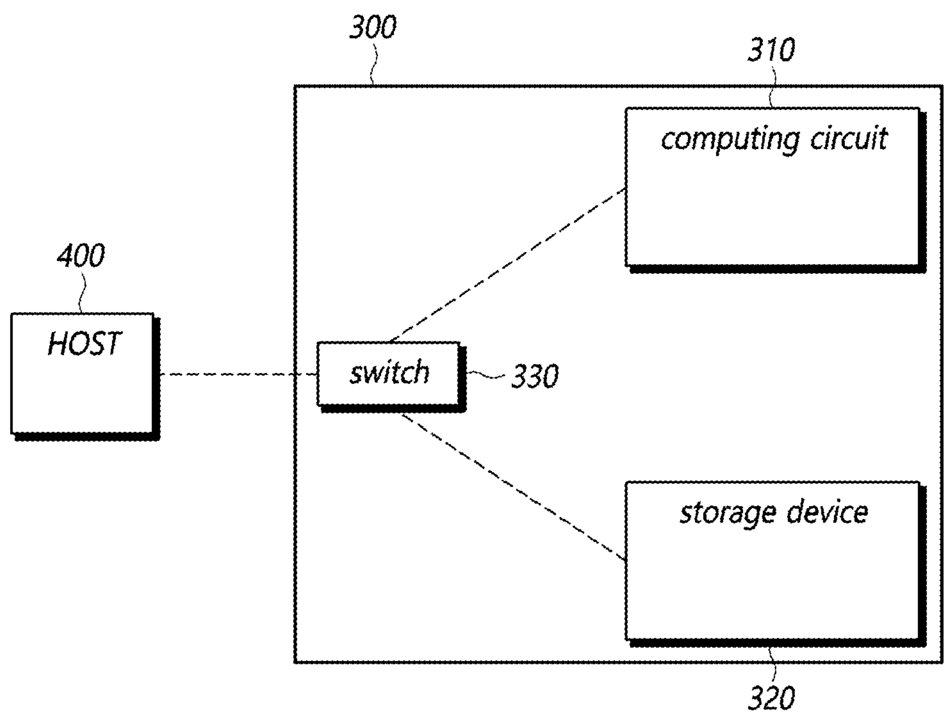
FIG. 3 illustrates a schematic structure of a computational storage system according to embodiments of the present disclosure.

FIG. 3 illustrates a schematic structure of a computational storage system according to embodiments of the present disclosure.

Referring to FIG. 3, a computational storage system 300 may include a computing circuit 310, a storage device 320 and a switch 330.

The computing circuit 310 may execute an operation or perform a computation. The operation may be requested by a host 400.

The computing circuit 310 may be implemented in various ways.

For example, the computing circuit 310 may be a field programmable gate array (FPGA). In this case, the computing circuit 310 may include designable logic devices and programmable internal circuits.

In another example, the computing circuit 310 may be a microprocessor. In this case, the computing circuit 310 may run firmware in which a function for executing an operation requested by the host 400 is defined.

The storage device 320 may store data. The host 400 may write data to the storage device 320 and read data stored in the storage device 320.

The storage device 320 may be implemented in various ways.

For example, the storage device 320 may be a storage device 100 described above with reference to FIG. 1.

As another example, the storage device 320 may be any volatile memory (e.g., SRAM, DRAM) or non-volatile memory (e.g. ROM, HDD).

The switch 330 may be connected to the computing circuit 310 and the storage device 320. In this case, the switch 330 may establish a connection among the host 400, the computing circuit 310, and the storage device 320. The switch 330 may establish a connection among the host 400, the computing circuit 310, and the storage device 320 through a preset interface (e.g., PCIe).

In embodiments of the present disclosure, the computational storage system 300 may provide an access request to the computing circuit 310 or the storage device 320 according to a set topology. This may be performed by the switch 330 or the computing circuit 310.

In embodiments of the present disclosure, a setting of the switch 330 may be used to determine whether the host 400 can directly access each of the computing circuit 310 and the storage device 320.

To this end, the switch 330 may execute the following operations.

For example, the switch 330 may activate at least one of the connection lines connected to the host 400, one of the connection lines connected to the computing circuit 310, and one of the connection lines connected to the storage device 320.

In order to activate one or more of the connection lines, the switch 330 may include a multiplexer that selects an activated connection line.

The switch 330 may establish a connection between the host 400, the computing circuit 310, and the storage device 320 depending on a topology for the host 400, the computing circuit 310, and the storage device 320.

The operation of determining the topology may be executed in various ways.

As an example, the operation of determining the topology may be executed by the computing circuit 310. In another example, the operation of determining the topology may be executed by the storage device 320. In yet another example, the operation of determining the topology may be executed by a separate device included in the computational storage system 300.

Accordingly, the computational storage system 300 may configure an optimized topology according to the application executed by the host 400 without fixing the topology to a specific topology (e.g. first topology or second topology). Since there are advantages and disadvantages depending on the method of determining the topology, in embodiments of the present disclosure, the computational storage system 300 is not limited to one method but may selectively determine the topology as the first or second topology.

The switch 330 of the computational storage system 300 may establish connections between the host 400, the computing circuit 310, and the storage device 320 according to a determined topology. This will be described in detail with reference to FIGS. 4 and 5 below.

Figure 4:
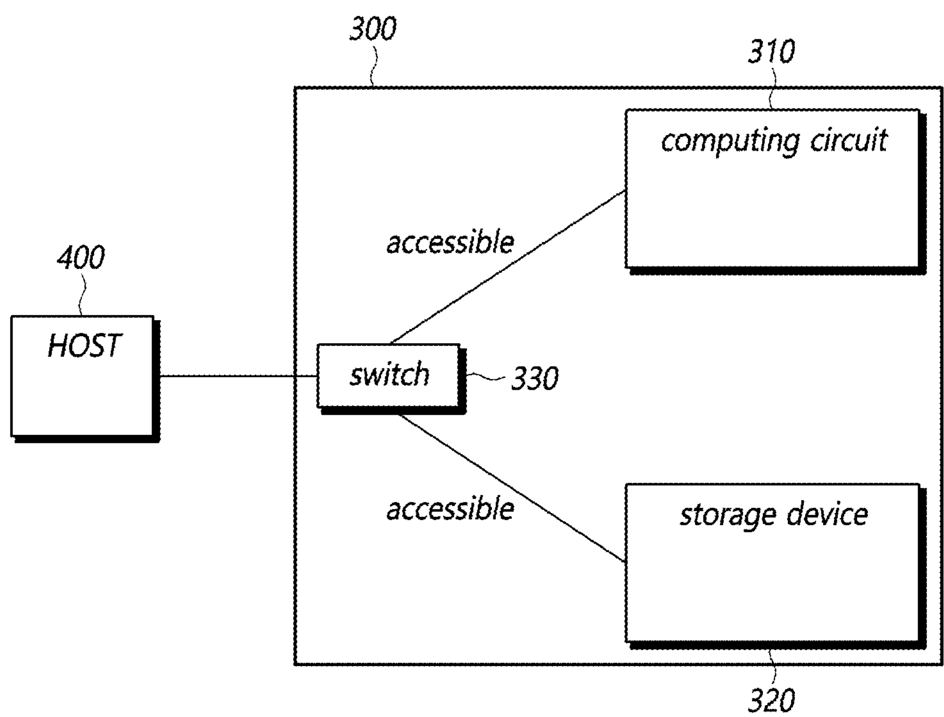
FIG. 4 illustrates an example of a topology of a computational storage system according to an embodiment of the present disclosure.

FIG. 4 illustrates an example of a topology of a computational storage system according to an embodiment of the present disclosure.

In FIG. 4, a computational storage system 300 may determine a topology among a host 400, a computing circuit 310, and a storage device 320 as a first topology TP_1. The first topology TP_1 may be referred to as a P2P (i.e., Peer-to-Peer) type topology.

If the topology is determined as a first topology TP_1, a switch 330 of the computational storage system 300 may establish connections so that the computing circuit 310 and the storage device 320 can be directly accessed by the host 400. In this case, the switch 330 may distribute an access request for the computing circuit 310 or the storage device 320 to the computing circuit 310 or the storage device 320.

Furthermore, the host 400 may recognize the computing circuit 310 and the storage device 320 as independent devices.

In embodiments of the present disclosure, the computational storage system 300 may determine a topology as the first topology TP_1 in the following scenarios.

For example, the computational storage system 300 may determine the topology as the first topology TP_1 when the computing circuit 310 executes an independent operation that does not access the storage device 320, or when the computing circuit 310 executes an operation using data stored in an additional storage device (not shown) other than the storage device 320, or when the host 400 executes an operation using a number of commands greater than a threshold count.

Figure 5:
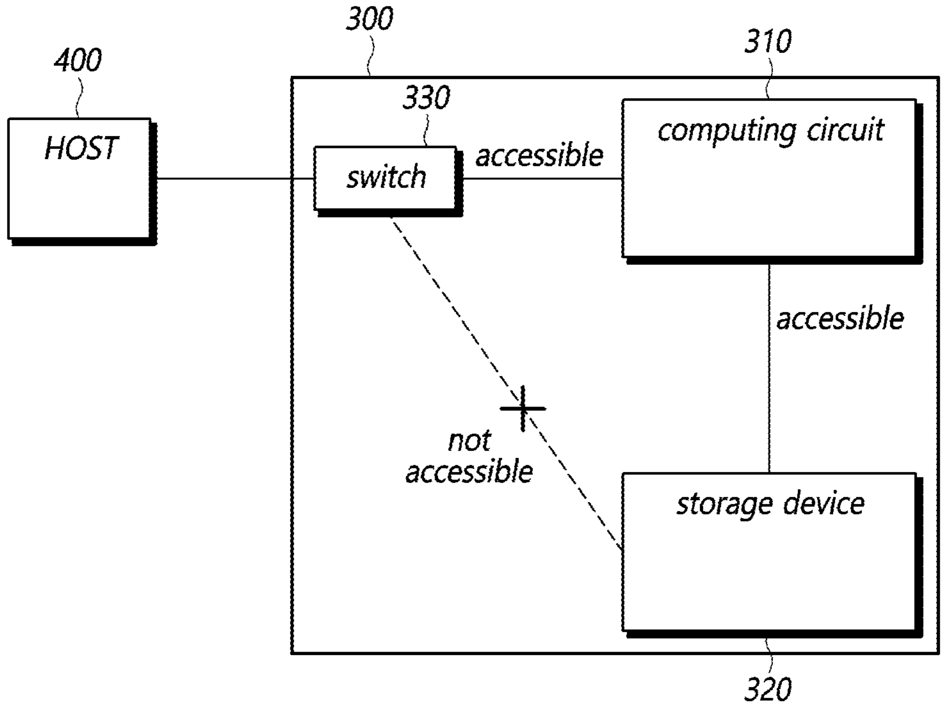
FIG. 5 illustrates another example of a topology of a computational storage system according to an embodiment of the present disclosure.

FIG. 5 illustrates another example of a topology of a computational storage system 300 according to an embodiment of the present disclosure.

In FIG. 5, a computational storage system 300 may determine a topology between a host 400, a computing circuit 310 and a storage device 320 as a second topology TP_2. The second topology may be referred to as an inline topology.

If the topology is determined as a second topology TP_2, the switch 330 of the computational storage system 300 may establish a connection so that the computing circuit 310 can be directly accessed by the host 400 and the storage device 320 cannot be directly accessed by the host 400. In this case, after receiving an access request for the computing circuit 310 or the storage device 320, the computing circuit 310 may directly process the access request or bypass the access request for the storage device 320.

As a result, as between the computing circuit 310 and the storage device 320, the host 400 may recognize only the computing circuit 310 as an independent device.

Therefore, the host 400 cannot directly request the storage device 320 to write data into the storage device 320 or to read data stored in the storage device 320.

Instead, the host 400 may transmit a request for the storage device 320 first to the computing circuit 310, and then the computing circuit 310 may access the storage device 320 according to the request received from the host 400. Thus, a request of the host 400 for the storage device 320 is required to pass through the computing circuit 310.

FIG. 5 illustrates the computing circuit 310 accessing the storage device 320 without passing through the switch 330. However, embodiments of the present disclosure are not limited thereto, and the computing circuit 310 may also access the storage device 320 via a switch 330.

In embodiments of the present disclosure, the computational storage system 300 may determine the topology as the second topology TP_2 in the following situations.

As an example, the computational storage system 300 may determine the topology as the second topology TP_2 when the computing circuit 310 executes an operation using only data stored in the storage device 320, or when the host 400 executes an operation using a number of commands less than a threshold count, or when the host 400 executes an operation in which the amount of change in a software stack of the host 400 is less than a threshold amount of change, or when the computing circuit 310 executes an additional operation (e.g., transparent encryption for data, transparent compression) that the host 400 cannot recognize.

An operation of the computational storage system 300 according to the topology to establish a connection among the host 400, the computing circuit 310, and the storage device 320 has been described above.

Hereinafter, an operation of the computational storage system 300 will be described according to topology described below with reference to FIGS. 6 and 7.

Figure 6:
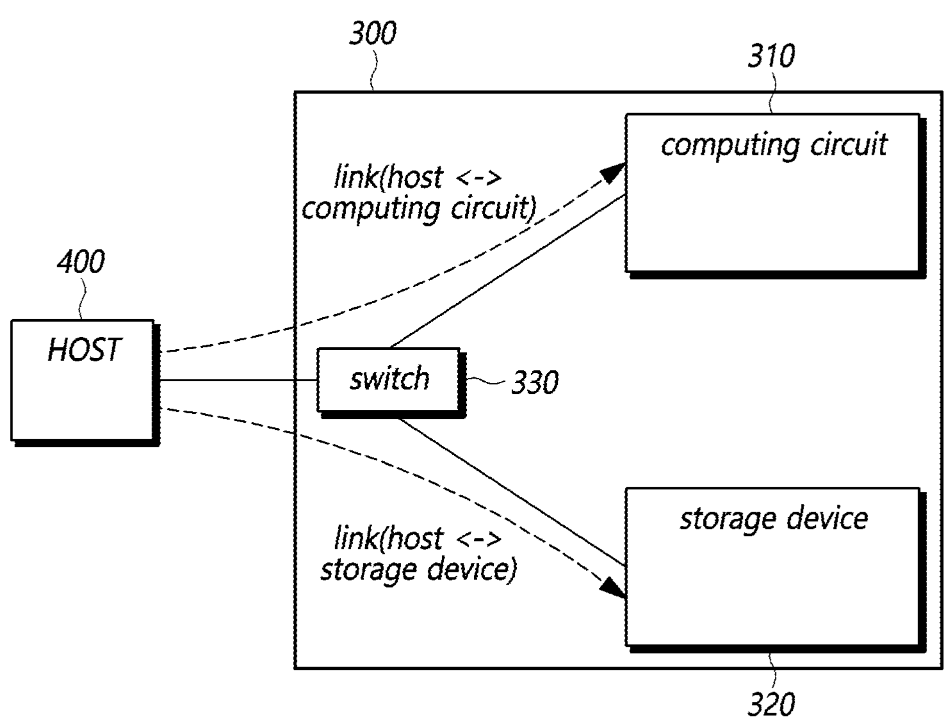
FIG. 6 illustrates an example of an operation of a computational storage system according to an embodiment of the present disclosure.

FIG. 6 illustrates an example of an operation of a computational storage system according to an embodiment of the present disclosure.

Referring to FIG. 6, when the topology is determined as a first topology TP_1, the switch 330 may establish a link between the host 400 and the computing circuit 310 and a link between the host 400 and the storage device 320.

The link between the host 400 and the computing circuit 310 and the link between the host 400 and the storage device 320 may be determined according to an interface supported by the switch 330. For example, if the switch 330 supports a PCIe interface, then the link between the host 400 and the computing circuit 310 and the link between the host 400 and the storage device 320 may be PCIe links.

The host 400 may directly access the computing circuit 310 through the link between the host 400 and the computing circuit 310 described above. In addition, the host 400 may directly access the storage device 320 through the link between the host 400 and the storage device 320.

Figure 7:
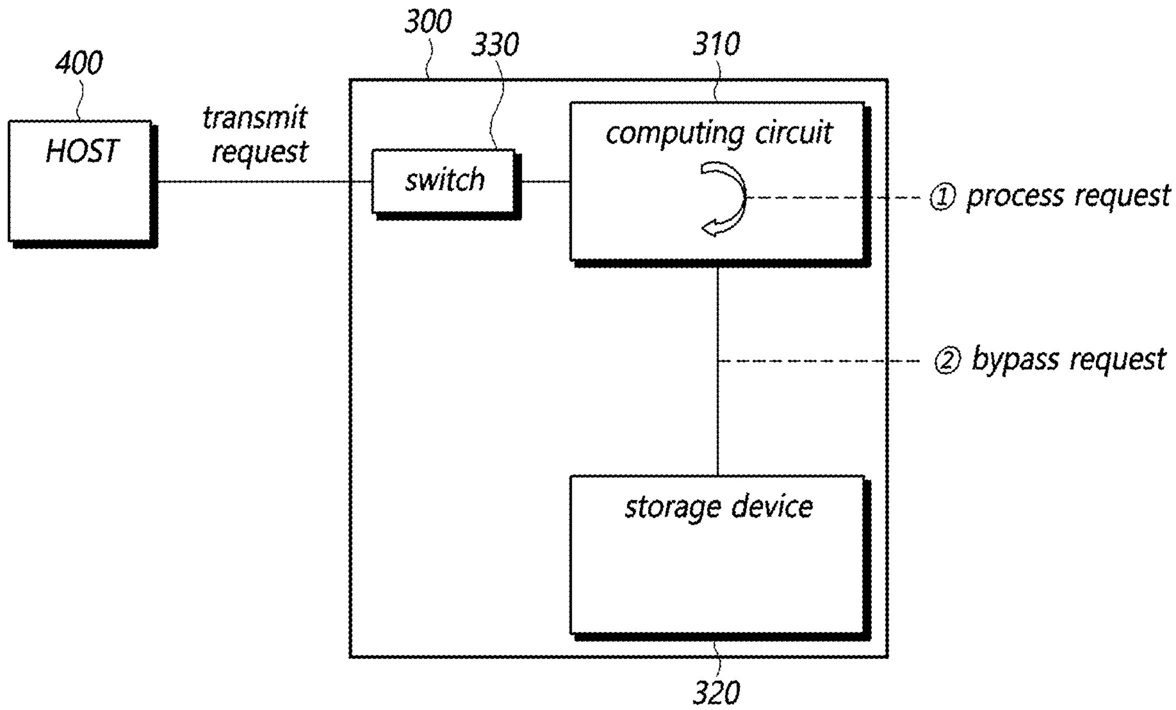
FIG. 7 illustrates another example of an operation of a computational storage system according to an embodiment of the present disclosure.

FIG. 7 illustrates another example of an operation of a computational storage system according to an embodiment of the present disclosure.

Referring to FIG. 7, if the topology is determined as a second topology TP_2, when a host 400 transmits a request for a storage device 320, a switch 330 may first transmit a request to a computing circuit 310.

In addition, the computing circuit 310 may directly process the request received from the host 400 or bypass the request received from the host 400 for the storage device 320.

If the computing circuit 310 bypasses the request received from the host 400 for the storage device 320, the computing circuit 310 does not directly process the request and instead the storage device 320 may process the request. In addition, the computing circuit 310 may receive a response to the request from the storage device 320, and transmit the received response to the host 400.

If the request received from the host 400 is a request for a computational operation, then the computing circuit 310 may directly process the request.

If the request received from the host 400 is a request for a read operation or a write operation, then the computing circuit 310 may bypass the request to the storage device 320 without directly processing the request. The storage device 320 may process the request bypassed by the computing circuit 310.

In FIG. 7, the computing circuit 310 bypasses the request to the storage device 320 without going through the switch 330. However, embodiments of the present disclosure are not limited thereto, and the computing circuit 310 may also bypass the request to the storage device 320 through the switch 330.

In embodiments of the present disclosure, a computational storage system 300 may store, within the computational storage system 300, information on whether the topology is a first topology TP_1 or a second topology TP_2. This will be described below with reference to FIG. 8.

Figure 8:
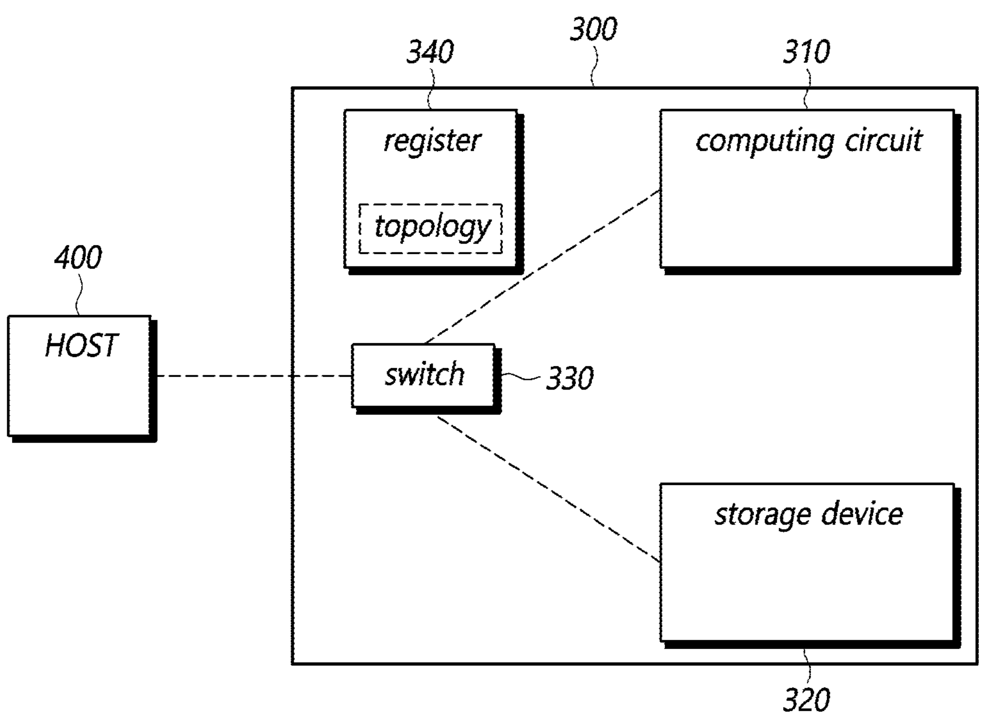
FIG. 8 illustrates a register of a computational storage system according to an embodiment of the present disclosure.

FIG. 8 illustrates a register of a computational storage system according to an embodiment of the present disclosure.

Referring to FIG. 8, a computational storage system 300 may further include a register 340 indicating whether a topology is a first topology TP_1 or a second topology TP_2.

A method of setting the topology in the register 340 may be determined in various ways. For example, a host 400 may directly access the register 340 to set the topology. In another example, a storage device 320 may access the register 340 to set the topology.

In the above, a computing circuit 310, the storage device 320, a switch 330 and the register 340 included in the computational storage system 300 are described as independent devices.

However, in embodiments of the present disclosure, the computing circuit 310, the storage device 320, the switch 330 and the register 340 are not necessarily limited to independent devices. For example, at least one of the computing circuit 310, the storage device 320, the switch 330 and the register 340 may be included within another.

Figure 9:
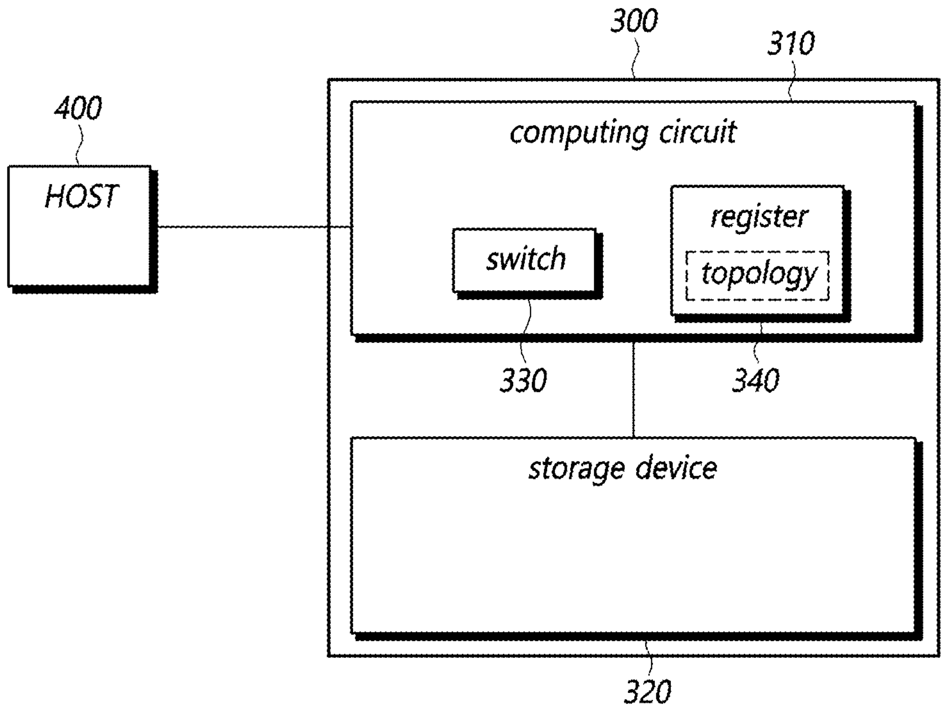
FIG. 9 illustrates an example of an implementation of a computational storage system according to an embodiment of the present disclosure.

FIG. 9 illustrates an example of an implementation of a computational storage system according to an embodiment of the present disclosure.

Referring to FIG. 9, a switch 330 and a register 340 may be included within a computing circuit 310.

For example, if the computing circuit 310 is implemented as a field programmable gate array (FPGA), the switch 330 may be configured as part of the logic devices and internal circuits included within the computing circuit 310. In addition, the register 340 may be configured as part of a data storage device included within the computing circuit 310.

Figure 10:
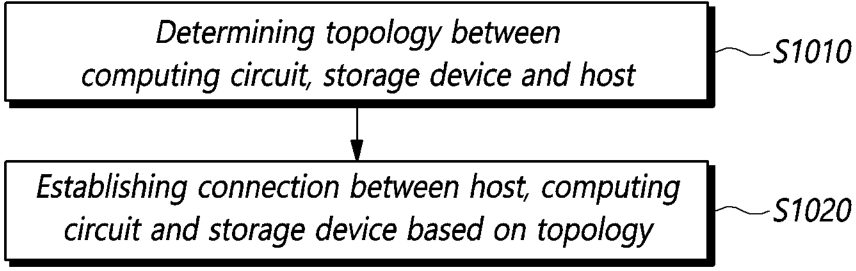
FIG. 10 illustrates an operating method of a computational storage system according to an embodiment of the present disclosure.

FIG. 10 illustrates an operating method of a computational storage system according to an embodiment of the present disclosure.

Referring to FIG. 10, an operating method of a computational storage system 300 may include a step S1010 of determining a topology among a host 400, a computing circuit 310 executing an operation requested by the host 400, and a storage device 320 storing data.

As an example, step S1010 may include determining a topology as a first topology TP_1 when the computing circuit 310 executes an independent operation that does not access the storage device 320, or when the computing circuit 310 executes an operation using data stored in an additional storage device other than the storage device 320, or when the host 400 executes an operation using a number of commands greater than a threshold count.

As another example, step S1010 may include determining a topology as a second topology TP_2 when the computing circuit 310 executes an operation using only data stored in the storage device 320, or when the host 400 executes an operation using a number of commands less than a threshold count, or when the host 400 executes an operation in which the amount of change in a software stack of the host 400 is less than a threshold amount of change, or when the computing circuit 310 executes an additional operation that the host 400 cannot recognize.

In addition, the operating method of the computational storage system 300 may include a step S1020 of establishing a connection among the host 400, the computing circuit 310, and the storage device 320 based on the topology determined in step S1010.

Step S1020 may include establishing a connection so that the computing circuit 310 and the storage device 320 can be directly accessed by the host 400 when the topology is the first topology TP_1.

In this case, step S1020 may include establishing a link between the host 400 and the computing circuit 310 and a link between the host 400 and the storage device 320.

If the topology is the second topology TP_2, then step S1020 may include establishing or setting up a connection so that the computing circuit 310 can be directly accessed by the host 400 and the storage device 320 cannot be directly accessed by the host 400.

In this case, the computing circuit 310 may directly process a request received from the host 400 or bypass a request received from the host 400 for the storage device 320.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A computational storage system comprising:
 a computing circuit configured to execute an operation requested by a host;
 a storage device for storing data; and
 a switch configured to establish a connection among the host, the computing circuit and the storage device based on a topology for the host, the computing circuit and the storage device,
 wherein the switch is configured to,
 establish connections so that the host directly accesses the computing circuit and the storage device when the topology is a first topology, and
 establish connections so that the host directly accesses the computing circuit and is unable to directly access the storage device when the topology is a second topology,
 wherein the topology is determined as the first topology when the computing circuit executes an independent operation that does not access the storage device, when the computing circuit executes an operation utilizing data stored in an additional storage device other than the storage device, or when the host executes an operation using a number of commands greater than or equal to a threshold count.

2. The computational storage system of claim 1, wherein the computing circuit is a field programmable gate array (FPGA).

3. The computational storage system of claim 1, wherein the switch establishes a link between the host and the computing circuit and a link between the host and the storage device when the topology is the first topology.

4. The computational storage system of claim 1, wherein, when the topology is the second topology, the computing circuit directly processes a request received from the host or bypasses a request received from the host for the storage device.

5. The computational storage system of claim 1, wherein the topology is determined as the second topology when the computing circuit executes an operation using only data stored in the storage device, when the host executes an operation using a number of commands less than a threshold count, when the host executes an operation in which an amount of change in a software stack of the host is less than a threshold amount of change, or when the computing circuit executes an additional operation that the host is unable to recognize.

6. The computational storage system of claim 1, further comprising a register indicating whether the topology is the first topology or the second topology.

7. An operating method of a computational storage system comprising:
 determining a topology for a host, a computing circuit for executing an operation requested by the host, and a storage device for storing data; and
 establishing a connection among the host, the computing circuit, and the storage device based on the topology,
 wherein the establishing a connection includes,
 establishing a connection so that the host directly accesses the computing circuit and the storage device when the topology is a first topology, and
 establishing a connection so that the host directly accesses the computing circuit and does not directly access the storage device when the topology is a second topology,
 wherein the determining a topology includes determining the topology as the first topology when the computing circuit executes an independent operation that does not access the storage device, when the computing circuit executes an operation utilizing data stored in an additional storage device other than the storage device, or when the host executes an operation using a number of commands greater than or equal to a threshold count.

8. The operating method of claim 7, wherein the establishing a connection includes establishing a link between the host and the computing circuit and a link between the host and the storage device when the topology is the first topology.

9. The operating method of claim 7, wherein, when the topology is the second topology, the computing circuit directly processes a request received from the host or bypasses a request received from the host for the storage device.

10. The operating method of claim 8, wherein the determining a topology includes determining the topology as the second topology when the computing circuit executes an operation using only data stored in the storage device, when the host executes an operation using a number of commands less than a threshold count, when the host executes an operation in which an amount of change in a software stack of the host is less than a threshold amount of change, or when the computing circuit executes an additional operation that the host is unable to recognize.

11. A computational storage system comprising:
 a computing circuit configured to execute an operation;
 a storage device for storing data; and
 a switch connected to the computing circuit and the storage device,
 wherein the computational storage system transmits an access request for the computing circuit or the storage device to the computing circuit or the storage device based on a set topology,
 wherein the switch distributes the access request to the computing circuit or the storage device when the set topology is a first topology,
 wherein the computing circuit directly processes the access request after receiving the access request or bypasses the access request for the storage device when the set topology is a second topology,
 wherein the set topology is determined as the first topology when the computing circuit executes an independent operation that does not access the storage device, when the computing circuit executes an operation utilizing data stored in an additional storage device other than the storage device, or when a host requesting an operation to the computing circuit executes an operation using a number of commands greater than or equal to a threshold count.

* * * * *